March 31, 1959 N. W. PARKER 2,880,266
COLOR TELEVISION SYNCHRONIZING APPARATUS
WITH COLOR BURST EXALTATION
Filed June 9, 1954
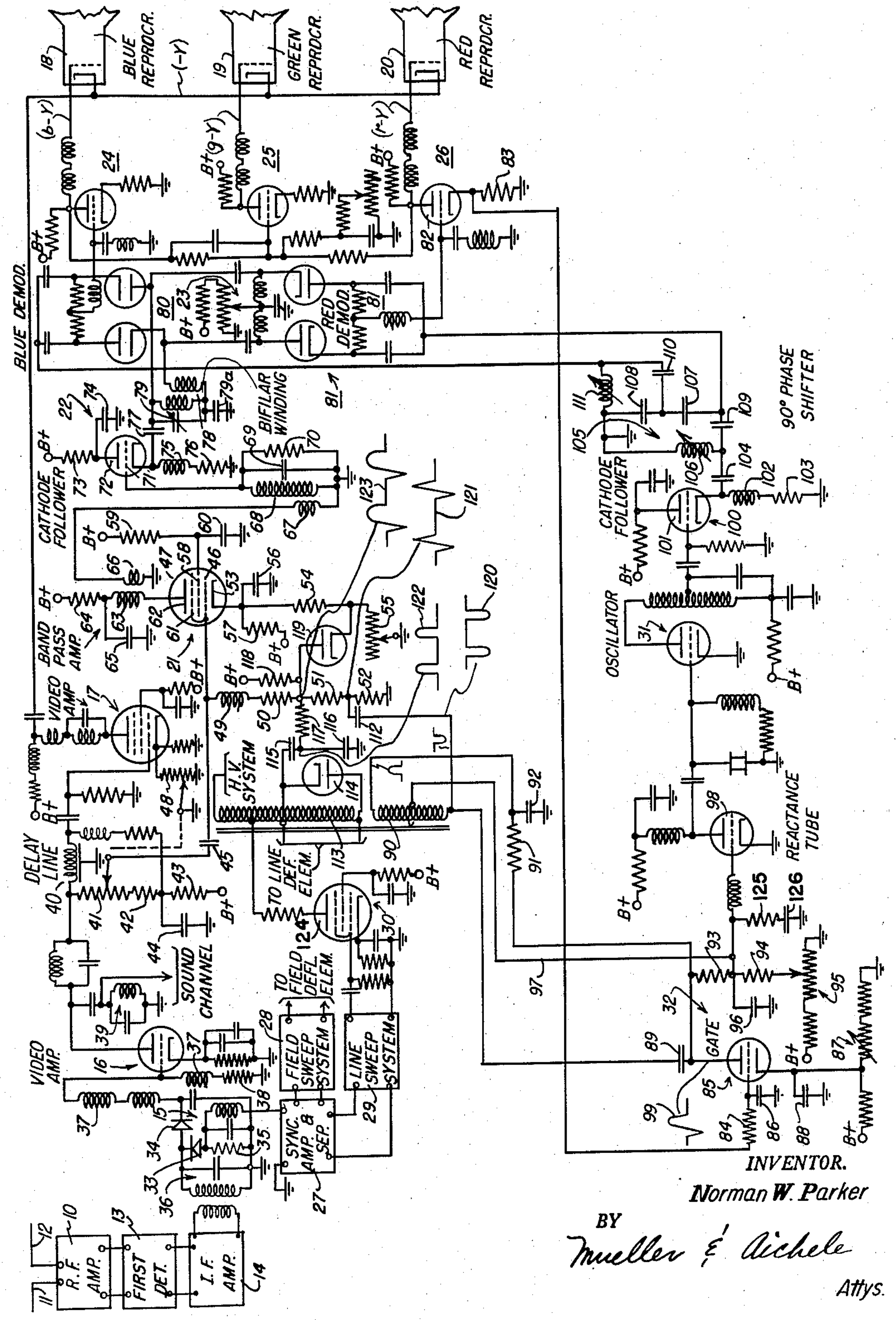
INVENTOR.
Norman W. Parker
BY
Mueller & Aichele
Attys.

2,880,266

COLOR TELEVISION SYNCHRONIZING APPARATUS WITH COLOR BURST EXALTATION

Norman W. Parker, Wheaton, Ill., assignor to Motorola, Inc., Chicago, Ill., a corporation of Illinois Application June 9, 1954, Serial No. 435,428

13 Claims. (Cl. 178—5.4)

The present invention relates to color television receivers and more particularly to an improved color television receiver of the type which utilizes a color television signal including a monochrome component and color difference sub-carrier components.

In order to achieve compatibility in existing monochrome television receivers, a color television system designated NTSC has been devised in which separate color video signals are obtained at the transmitter from a suitable picture converting means and which represent various primary color intensities of the scene to be televised. These color video signals are combined in selected proportions to constitute a monochrome video signal which, in turn, is combined with line and field synchronizing components to form a television signal which is modulated on a main carrier wave. This television signal is so constituted that it conforms in all respects with present-day monochrome standards and can be reproduced in black and white in existing monochrome receivers. To enable the televised scene to be reproduced in color in color television receivers, two of the color video signals are mixed with the monochrome signal at the transmitter to constitute a pair of color difference video signals, each bearing distinct chroma information. These color difference signals are modulated respectively on a pair of phase quadrature sub-carrier components having the same frequency, and the sub-carrier components are, in turn, modulated on the main carrier of the color television signal. This composition for the color television signal has recently been adopted by the Federal Communications Commission as the standard for the United States.

Full details of a typical NTSC color television system may be found in the February 1952 edition of "Electronics Magazine," published by McGraw-Hill Corporation, in an article entitled "Principles of NTSC Compatible Color Television," by W. C. Hirsch et al., at page 88 of that publication. As fully described in the article, it is usual in a tri-color television system to modulate the blue $(b-y)$ and red $(r-y)$ color-difference signals on the chroma sub-carrier components discussed above, and to reconstitute the green $(g-y)$ color-difference signal at the receiver in a suitable matrix.

It is also usual in NTSC color television systems to include in the television signal, bursts of a reference signal of the same frequency as the color sub-carrier components and in phase with one of these components. These bursts are impressed upon successive line blanking pulses in the color television signal immediately following the respective line synchronizing pulses pedestalled on the blanking pulses, and are used in the color receiver to synchronize a color demodulating signal oscillator included therein.

Copending application Serial No. 372,547, filed August 5, 1953, in the name of Norman W. Parker, entitled "Color Television Receiver" and assigned to the present assignee, discloses a color television receiver for operation in a system such as that described above. The present invention provides a color television receiver that is similar in some respects to that disclosed in the copending application, but which incorporates certain features that are not included in the system of that application.

It is, accordingly, a general object of the present invention to provide an improved color television receiver for operation in an NTSC color television system, and which is constructed so that the televised scene may be reproduced in color by means of relatively simple circuitry and relatively few component parts.

Another object of the invention is to provide a color television receiver that includes improved and simplified means for synchronizing a color demodulating signal oscillator included therein with a received color television signal.

Another object of the invention is to provide a color television receiver that includes improved and simplified means for supplying the signal from the color oscillator referred to above to the chroma demodulators for efficient demodulation of the chroma sub-carrier components.

The copending application previously referred to discloses a color television receiver in which the chroma information represented by the color-difference signals is recovered from each of the sub-carrier components by a demodulator which produces the chroma information on an essentially zero direct-current axis. This facilitates the use of a simple direct-current coupled amplifier stage for each of the demodulated color-difference signals and obviates the need for direct-current re-inserters. With this arrangement, the color synchronizing bursts of reference signal which are also detected by the chroma demodulators, along with the sub-carrier components, are passed directly to the reproducing means in the form of a series of pulses. Since these pulses each occur during retrace intervals, they do not cause distortion in the reproducing means. In prior art receivers using direct-current re-inserters, the detected color bursts tend to adversely affect the operation of such inserters and additional circuitry is required to prevent this.

Color television receivers of the NTSC type also include a color oscillator which supplies demodulating signals to the chroma demodulators. This oscillator is synchronized with the color synchronizing bursts in the received color television signal so that the demodulating signal developed thereby may have the proper frequency and phase with respect to the chroma sub-carrier components to enable the chroma demodulators properly to perform their detecting function. The copending application also discloses a simple means for synchronizing the color oscillator by using the detected synchronizing reference-signal bursts appearing at the output of one of the chroma demodulators. It is desirable with this type of synchronization that the detected bursts have a relatively high amplitude whenever the phase or frequency of the demodulating signal shifts from its proper value so as to provide a sensitive control for the color oscillator. However, the manual color contrast control of the color receiver controls the amplitude of the output signals of the chroma demodulators, and, including the detected reference-signal bursts, when this control is adjusted to a low amplitude level, the sensitivity of the control of the color oscillator is decreased in the system of the copending application due to the relatively low amplitude of the detected synchronizing bursts for this adjustment.

A feature of the present invention resides in the provision of a simple network for imparting a high amplitude to the detected color synchronizing bursts appearing at the output of the chroma demodulators with respect to the detected chroma information, so that these detected bursts may provide a highly sensitive control for the color oscillator, regardless of the setting of the color contrast control.

As also discussed in the aforementioned copending application, it is necessary for the output signals from the chroma demodulators to be passed through a gate circuit prior to their application to the color oscillator. This gate circuit is actuated at the proper times so that only the pulses corresponding to the detected synchronizing bursts are translated by the gate to the exclusion of the other detected components of the color sub-carriers. Difficulties have been encountered in providing an adequate gating signal for this gate circuit that will assure only the translation of the detected color synchronizing bursts.

In accordance with another feature of the present invention, a simple network is provided for supplying properly timed gating pulses to the gating circuit and which have a desired individual time duration to enable the circuit properly to perform its gating function.

The NTSC color television receiver includes two chroma demodulators, one for the $(b-y)$ color-difference signal and one for the $(r-y)$ color-difference signal. As previously noted, these signals are modulated on like-frequency, phase-quadrature, sub-carrier components. To provide selective demodulation of these color-difference signals, it is necessary to supply a pair of demodulating signals to the chroma demodulators having the frequency of the sub-carrier components and respectively having the phase of these components. This is achieved by applying the demodulating signal from the color oscillator to one of the demodulators without any phase shift, and by passing this signal through a 90 degree phase shifter before its application to the other demodulator.

Another feature of the present invention is the provision of a simplified network for applying the demodulating signal to the chroma demodulators which comprises a pair of resonant networks that may readily be tuned without inter-action to supply the demodulating signals to the chroma demodulators with the desired phase quadrature relation.

The above and other features of the invention which are believed to be new are set forth with particularity in the appended claims. The invention itself, however, together with further objects and advantages thereof, may best be understood by reference to the following description when taken in conjunction with the accompanying drawing in which the single figure shows a preferred embodiment of the invention.

The color television receiver of the present invention utilizes a color television signal which includes at least one chroma sub-carrier component and which also includes bursts of a reference signal component having a predetermined frequency and phase relation with the sub-carrier component. The receiver comprises a band pass network for selecting the chroma sub-carrier components and the reference signal bursts of the color television signal, and a chroma demodulator is coupled to the band pass network and produces a detected component in response to the reference signal bursts that varies in accordance with phase variations between the sub-carrier and a demodulating signal applied to the demodulator. The receiver also includes a circuit for producing such a demodulating signal for the demodulator, and a control network for that circuit is coupled to the demodulator and responds to the aforementioned component produced thereby to maintain a selected phase relation between the demodulating signal and the sub-carrier. Finally, the receiver includes a circuit for deriving and applying signal components to the band pass network having a selected timing with respect to the reference signal bursts to exalt the bursts as translated by the band pass network and applied to the chroma demodulator.

The color television receiver of the invention includes a radio-frequency amplifier 10 having input terminals coupled to a suitable antenna 11, 12 and having output terminals coupled through a first detector 13 to an intermediate-frequency amplifier 14. The intermediate-frequency amplifier is coupled to a second detector 15 which, in turn, is coupled to a video amplifier indicated generally as 16. Video amplifier 16 is coupled to the brightness channel of the receiver and this channel includes a second video amplifier indicated generally as 17, the latter being coupled to the cathodes of a plurality of color cathode-ray image-reproducing means 18, 19 and 20. The reproducing means 18, 19 and 20 are shown as fragments of three separate reproducing devices for purposes of clarity, but it is to be understood that these may be combined within a single envelope as is common practice.

Video amplifier 16 is also coupled to the chroma channel of the receiver, and this channel includes a band-pass amplifier indicated generally as 21; this amplifier being coupled through a cathode-follower stage 22 to a pair of chroma demodulators 23. The chroma demodulators are coupled through three direct-current coupled amplifiers 24, 25, 26 which, in turn, are coupled to the respective control electrodes of reproducing devices 18, 19 and 20.

Detector 15 is also coupled to a synchronizing signal amplifier and separator 27 which, in turn, is connected to a field sweep system 28 and to a line sweep system 29. The field sweep system is coupled to the field deflection elements (not shown) of the image reproducing means, and the line sweep system 29 is coupled through an output stage 30 to the line deflection elements of the reproducing means which, likewise, are not shown.

The receiver also includes a color oscillator 31 for supplying demodulating signals to the chroma demodulators 23, this oscillator being controlled by the detected reference-signal bursts of the color television signal through a gate 32 in a manner to be described.

As previously noted, the NTSC color television signal includes a brightness signal component modulated on a main carrier, and a pair of phase-quadrature chroma subcarrier components having the same frequency which are also modulated on the main carrier. The chroma subcarriers are modulated respectively by $(r-y)$ and $(b-y)$ chroma information, and the color television signal also includes bursts of a reference signal having the frequency of the color sub-carriers and in phase, for example, with the $(b-y)$ sub-carrier. The reference signal bursts have the same repetition frequency as the line synchronizing pulses and are impressed on the respectively back porches of the line blanking pulses.

When the receiver is tuned to receive a color television signal such as that described above, the signal is intercepted by antenna 11, 12 and amplified by radio-frequency amplifier 10. The amplified signal from the radio-frequency amplifier is heterodyned to the selected intermediate frequency of the receiver in first detector 13, and the resulting intermediate-frequency signal is amplified in intermediate-frequency amplifier 14. The amplified intermediate-frequency signal is detected in second detector 15, and the resulting composite video signal is amplified in video amplifier 16.

Only the brightness signal component $(y)$ of the composite video signal is selected by the brightness channel, and this component is amplified in video amplifier 17 and applied with negative phase $(-y)$ to the cathodes of reproducing means 18, 19 and 20.

The chroma sub-carrier components and the reference-signal bursts of the detected color television signal are selected and amplified in band-pass amplifier 21 and supplied to the chroma demodulators 23. The chroma demodulators respond to respective demodulating signals from color oscillator 31 of the proper phase and frequency to develop the $(b-y)$ and $(r-y)$ color-difference signals, and these color-difference signals are amplified in the direct-current coupled amplifiers 24, 26 and supplied to the control electrodes of the respective reproducing devices 18 and 20. These color-difference signals are combined in a suitable matrix to provide the $(g-y)$ color difference signal, and the latter is amplified by direct-current coupled amplifier 25 and supplied to the control electrode of reproducing device 19.

Reproducing device 18 is designated the blue cathode-ray tube, reproducing device 19 the green cathode-ray tube, and reproducing device 20 the red cathode-ray tube. The $(-y)$ signal is supplied to the cathode of the blue tube 18 and the $(b-y)$ signal to the control electrode of this tube, so that the resulting modulation of the cathode-ray beam is in accordance with blue chroma information. Similarly, the resulting modulation of the green beam is in accordance with the green chroma information, and the resulting modulation of the red beam is in accordance with the red chroma information.

As more fully described in copending application, Serial No. 324,496, filed December 6, 1952, in the name of the present inventor, entitled "Color Television Receiver" and assigned to the present assignee, the red color demodulator produces a series of pulses in response to the color reference-signal bursts, and the amplitude and polarity of these pulses varies from zero in accordance with phase variations between the demodulating signal applied to the red demodulator and the red color sub-carrier component. These pulses are selected by gate 32 and used to control the oscillator 31 so as to maintain the demodulating signals applied to the chroma demodulators 23 at the proper phase and frequency to enable the demodulators properly to perform their demodulating function.

The sound portion of the receiver forms no part of the present invention, and, for that reason, has not been shown.

The second detector 15 of the receiver includes a pair of rectifying devices 33, 34. Device 33 is connected in series with a load resistor 35 across the input coupling network 36 of the second detector, and this rectifier is connected with a selected polarity so that the detected composite video signal appears across load resistor 35 with negative-going polarity, this polarity being required by the synchronizing signal amplifier and separator 27. Rectifier 34, on the other hand, is connected in series with peaking coils 37 and a load resistor 38 across the coupling circuit 36 to apply the detected composite video signal to the first video amplifier 16 with positive-going polarity. This positive-going polarity is required so that the second video amplifier 17 will apply the composite video brightness signal to the reproducing means 18, 19 and 20 with positive-going polarity so that the blanking components of this signal will blank the reproducing means during retrace intervals.

The output circuit of video amplifier 16 includes a resonant network 39 which is tuned to the frequency of the intercarrier sound signal and across which this intercarrier signal is derived for application to the sound channel of the receiver (not shown) in well-known manner. Video amplifier 16 is coupled to the video amplifier 17 through a coupling network that includes a delay line 40 for delaying the brightness signal an amount corresponding to the delays suffered by the color difference signals in the chroma demodulating circuit of the receiver. The output circuit of video amplifier 16 is also connected to the positive terminal B+ of a source of unidirectional potential and this connection includes variable resistor 41 which is series connected with a pair of resistors 42, 43, the latter resistor being by-passed by a capacitor 44.

The movable tap of variable resistor 41 is coupled through a capacitor 45 to the control electrode 46 of an electron discharge device 47 which is connected to form the band-pass amplifier 21. This variable tap forms the manual color contrast control for the receiver and is mechanically coupled to a variable brightness contrast control resistor 48 in the cathode circuit of video amplifier 17.

Control electrode 46 is coupled to ground through an inductance coil 49 and through series-connected resistors 50, 51 and 52. The inductance coil 49 in conjunction with capacitor 45 forms a series resonant network which is tuned to the frequency of the color sub-carrier components, so that these components and the color-reference signal bursts are selected by the band-pass amplifier 21 to the exclusion of the brightness components of the received television signal.

Device 47 has a cathode 53 which is connected to ground through a resistor 54 and variable resistor 55, these resistors being shunted by a by-passing capacitor 56, and the cathode is also connected to the positive terminal B+ through a resistor 57. Variable resistor 55 forms a manual color gain control which is independent of brightness contrast. Device 47 also includes a screen electrode 58 which is coupled to the positive terminal B+ through a resistor 59 and which is by-passed to ground through a capacitor 60. The device also includes a suppressor electrode 61 which is connected to the cathode, and an anode 62 which is connected to the positive terminal B+ through an inductance coil 63 and a resistor 64, the junction of the coil and resistor being by-passed to ground through a capacitor 65. Screen resistor 59 has a relatively high resistance so that device 47 has remote cut-off characteristics for adequate color control by variable resistor 55. The positive bias provided by resistor 57 acts to extend the control range of this variable resistor.

An inductance coil 66 is inductively coupled to coil 63 and the inductance coil 66 has one side connected to ground and the other side connected to ground through a second inductance coil 67. The latter inductance coil is inductively coupled to an inductance coil 68, and inductance coil 68 is shunted by a capacitor 69 and damping resistor 70. One side of inductance coil 68 is connected to the control electrode 71 of an electron discharge device 72 which constitutes the cathode follower 22, and the other side of inductance coil 68 is connected to ground.

The anode of device 72 is connected to the positive terminal B+ through a resistor 73 and is by-passed to ground through a capacitor 74. The cathode of this device is connected to ground through a choke coil 75 and series resistor 76. The cathode is further coupled to a coupling capacitor 77 to one end of a pair of bifilar windings 78, these windings constituting the input circuit for the chroma demodulators 23. The junction of capacitor 77 and the bifilar windings is coupled to ground through a capacitor 79 and blocking capacitor 79*a*. Capacitor 79 tunes the bifilar windings to the frequency of the chroma sub-carrier components, and choke 75 is used so that resistor 76 will not excessively damp the tuned circuit.

The chroma demodulators 23 are connected in the manner disclosed in the previously mentioned copending application Ser. No. 372,547; and in copending application Serial No. 322,763, filed in the name of Kurt Schlesinger on November 26, 1952, entitled "Phase Detector" and assigned to the present assignee. As fully described in these applications, the chroma demodulators 23 include a first demodulating network 80 which responds to the sub-carrier components and a suitably phased demodulating signal for recovering the $(b-y)$ color difference signal, and also includes a demodulating network 81 which responds to the sub-carrier components and a second demodulating signal for recovering the $(r-y)$ color difference signal. These color-difference signals are recovered on a zero direct-current axis which permits their direct application to the reproducing means.

As previously noted, band-pass amplifier 21 selects the chroma sub-carrier components from the detected composite video signal, and this amplifier also selects the reference signal bursts which have the frequency of the sub-carrier components and are in phase with the $(r-y)$ sub-carrier component. The sub-carrier components and the reference signal bursts are amplified in amplifier 21, and are applied to cathode follower 22 by means of the coupling arrangement including coils 66 and 67. This particular coupling arrangement is used since it is often desired to mount the cathode follower 22 on a different chassis from the band-pass amplifier 21, and this arrangement provides an appropriate link coupling between these two stages. The cathode follower stage is used between the band-pass amplifier and the chroma demodulators to provide a suitable impedance match, that is, the chroma sub-carrier components and the reference signal bursts appear across capacitor 79 and this constitutes a low-impedance capacitive source for the signals. That is, capacitor 79 has a relatively high capacity compared with the capacity of the capacitors in the chroma demodulators, and the rapid change and discharge of the latter during the demodulating action does not change the charge on capacitor 79 appreciably. This prevents the capacitors in the chroma demodulators from producing clipping of the color-difference signals modulated on the chroma sub-carriers.

The red chroma demodulator 81 responds to a demodulating signal applied thereto having the frequency and phase of the red sub-carrier component to recover the $(r-y)$ color-difference signal. This signal is amplified in amplifier 26, which is directly coupled to the red demodulator, and is applied thereby to the red reproducing device 20. Amplifier 26 includes a discharge device 82 which has a cathode connected to ground through a resistor 83 to render the device degenerative for increased stability as described in copending application Ser. No. 372,547 previously referred to herein. Since the color reference bursts are in phase quadrature with the red sub-carrier component, these bursts are detected in the red demodulator 80 and appear across resistor 83 with zero amplitude when the red demodulating signal has the proper phase and frequency. Therefore, these bursts appear in the form of pulses across this resistor with a polarity with respect to a positive reference level dependent upon the direction of any deviation of the red demodulating signal from its proper frequency and phase and with an amplitude proportional to such variation.

The blue demodulator 80, on the other hand, responds to a demodulating signal applied thereto which is in phase quadrature with the demodulating signal applied to red demodulator 81 to recover the $(b-y)$ color-difference signal from the blue sub-carrier component. This latter color-difference signal is amplified in direct-coupled amplifier 24 and applied thereby to the blue reproducer 18. The color synchronizing bursts are also detected by the blue demodulator 80, and appear with maximum amplitude in its output circuit when the demodulating signal applied to that demodulator has the proper frequency and phase with respect to the blue sub-carrier component. The detected color reference pulses from the red and blue demodulators are amplified by amplifiers 24 and 26 respectively. However, since these pulses occur during retrace intervals, they do not affect the color image reproduction. Moreover, due to the fact that demodulators 23 are constructed to permit direct-current coupling to the image reproducers, the circuit does not require direct-current restorers which are adversely affected by such pulses.

The cathode of device 82 is connected through a resistor 84 to the control electrode of a discharge device 85 which is connected to form the gate 32, this control electrode being coupled to ground through a capacitor 86. The cathode of device 85 is coupled to ground through a capacitor 88 and is connected to a point on a potentiometer 87 connected between B+ and ground. This potentiometer establishes the operating threshold of the gate and provides an adjustment for the controlled frequency of the color oscillator 31. The anode of device 85 is coupled through a capacitor 89 to one side of a winding 90 which is included on the output transformer of the output stage 30 of the line deflection system. This anode is also connected to the other side of that winding through a resistor 91, the resistor being by-passed to ground through a capacitor 92. The anode is also connected through a pair of series resistors 93, 94 to a movable tap on a potentiometer 95 connected between the positive terminal B+ and ground. The common junction of resistors 93 and 94 is by-passed to ground through a capacitor 96 and is connected to the midpoint of winding 90 by a lead 97. This common junction is also coupled to a reactance tube 98 through a usual coupling network. The reactance tube is connected in known manner to control the frequency and phase of oscillator 31. A series network including resistor 125 and capacitor 126 is connected between the common junction and ground to suppress control signal transients.

With the connections described above, the signals appearing across cathode resistor 83 in amplifier 26 are applied to the control electrode of gate discharge device 85. The anode of this device is pulsed by differentiated pulses derived from winding 90 corresponding to the line retrace pulses which are developed across that winding. These line retrace pulses occur with negative polarity between the bottom of winding 90 and the midpoint to which lead 97 is connected, and they occur with positive polarity between the top of the winding and that midpoint. Resistor 93 and capacitor 89 form a differentiating circuit which differentiates the negative pulses to apply a series of differentiated pulses to the anode of device 85, with each differentiated pulse having a negative-going component and a positive-going component. The positive-going portions of these differentiated pulses occur in substantial time coincidence with the color reference bursts which, as previously stated, are pedestalled on the back porches of the line blanking pulses. In this manner gate discharge device 85 is rendered conductive by these positive portions at times corresponding to the detected pulses appearing across resistor 83 so that these pulses are translated by the gate 32. However, it has been found that under usual conditions, it is difficult to accurately time the positive portions of the differentiated pulses so as to be sure that gate 32 will translate the detected pulses applied thereto from resistor 83. To correct this situation, resistor 91 is provided which serves to impress the positive pulses from the top of winding 90 on the anode of gate discharge device 85 to produce the resultant waveform 99. This simple expedient produces a broadening of the positive portions of the differentiated pulses 99, and this resistor can be chosen so that the gate responds to the full duration of each of the detected pulses across resistor 83 to the exclusion of all other portions of the detected signal appearing across that resistor. The negative portions of the differentiated pulses drive the anode of device 85 in a negative direction so that they have no effect on the gating action.

The pulses translated by gate 32 are integrated by network 94—96 to produce a unidirectional control signal that varies on either side of a substantially zero axis, and this control signal controls oscillator 31 through reactance tube 98 so as to compensate for any tendency of the oscillator to vary from its proper frequency and phase. Potentiometer 95 provides a positive bucking bias so that gate device 85 may be operated on a point of its characteristic to provide high gain, yet the control signal axis can be made substantially zero, or any other desired value for the proper control of reactance tube 98.

Oscillator 31 produces a demodulating signal having the frequency of the color sub-carrier components and having the phase of the red sub-carrier component, and this demodulating signal is supplied to the chroma demodulators 23 through a cathode follower network 100. This cathode follower, like the cathode follower network 22, provides a low impedance capacitive source for the demodulating signals to prevent clipping in the chroma demodulators as previously discussed.

Cathode follower 100 includes an electron discharge device 101 having the cathode connected to ground through a choke coil 102 and series resistor 103. The cathode is further coupled through a blocking capacitor 104 to a parallel-resonant network 105. Network 105 includes a variable inductance coil 106 connected between capacitor 104 and ground, and this coil is shunted by a pair of capacitors 107 and 108 and by a blocking capacitor 109 which tune the coil to the frequency of the chroma sub-carrier components. Choke coil 102 prevents excessive damping of the resonant network by cathode resistor 103.

Capacitor 109 may be neglected for alternating-current purposes, and the alternating current junction of capacitor 107 and coil 106 is connected to the red chroma demodulator 81. By the simple adjustment of coil 106, network 105 can be brought into parallel resonance with the demodulating signal so that this signal is applied with maximum amplitude and no phase shift to the red demodulator 80. Capacitors 107 and 108 have a relatively high value with respect to the capacitors of the chroma demodulators, so as to prevent the aforementioned clipping of the demodulating signal due to the latter.

A series-resonant network including a capacitor 110 and variable inductance coil 111 is connected between the common junction of capacitors 107 and 108 and ground. This connection to the common junction of capacitors 107 and 108 prevents loading of the parallel-resonant network 105 by the series-resonant network. The junction of capacitor 110 and coil 111 is connected to the blue demodulator 80 and supplies a 90 degree phase shifted demodulating signal to the blue demodulator 81. By the simple adjustment of coil 111, the series-resonant network can be tuned precisely to the frequency of the demodulating signal, and this circuit has a relatively high quality factor so that a high amplitude demodulating signal is derived thereby, for the blue demodulator 81, this demodulating signal undergoing a 90 degree phase shift due to the inherent characteristics of the series-resonant network.

As previously pointed out, the color contrast control 41 is mechanically coupled to the brightness contrast control 48 for convenient manual adjustment of contrast in the receiver. Any adjustment of the color contrast control 41 varies the amplitude of the color sub-carrier components and color reference-signal bursts applied to the chroma demodulators 23. With the circuit thus far described, when this contrast is set to a minimum the sub-carrier components applied to the chroma demodulators have minimum amplitude and the color reference-signal bursts also have their amplitude reduced to a minimum. Because of this, the detected pulses appearing across cathode resistor 83 of amplifier 24 have a relatively small amplitude. Since these pulses are used to synchronize the color oscillator 31, it is desirable that they have a relatively high amplitude for any unwanted variation of the demodulating signal regardless of the setting of the chroma contrast control. The present invention provides a network for exalting the color reference bursts as translated by the band-pass amplifier so that the pulses across resistor 83 may have a relatively large amplitude for variations in the demodulating signal, despite a minimuum setting of the chroma contrast control.

This network includes the following connections: The bottom of winding 90 is coupled through a capacitor 112 to the common junction of resistors 51 and 52. The output transformer of the line deflection output stage 30 also includes a usual auto-transformer winding 113 having one end connected to a high voltage system (not shown) which supplies an accelerating potential to the reproducing means 18—20, in known manner. The anode of amplifier discharge device 124 in output stage 30 is connected to a tap on winding 113, and the line deflection elements of the reproducing means are connected between the lower end of the winding and another tap thereon. A damper diode 114 is connected across the line deflection elements in well-known manner, and this diode is shunted by a pair of series capacitors 115 and 116. The common junction of capacitors 115 and 116 is coupled through a resistor 117 to the common junction of resistors 50 and 51, this latter common junction being connected through a resistor 118 to the positive terminal B+ and through a diode 119 to the common junction of resistors 54 and 55.

As previously noted, winding 90 produces negative pulses at its bottom end corresponding to the line retrace pulses, and these negative pulses (shown in the wave form 120) are applied through capacitor 112 to resistor 52 across which they appear in differentiated form as shown by the wave form 121. The differentiated pulses of wave form 121 each have a negative portion and a positive portion. Damper diode 114 develops, on the other hand, a series of positive pulses (shown by the wave form 122) across capacitor 116 corresponding to the line-retrace pulses and these pulses are applied across resistors 51 and 52 wherein they are combined with the pulses of wave form 121 to form the resultant pulses shown by the wave form 123. The pulses of wave form 123 are formed to have positive portions which correspond in time to the color reference bursts, and these positive portions drive control electrode 46 of device 47 in a positive direction for the duration of each such burst. The network is such that transients between these portions are suppressed so that there is no distorting signal applied to the control electrode in the intervals of chroma information between these bursts. Diode 119 is connected to prevent the positive portions of the pulses of wave form 123 from driving control electrode 46 positive with respect to the cathode, since this would result in clipping of the color bursts and would also produce damping of the tuned input coupling circuit 45, 49 of the band-pass amplifier and ringing in its output circuit. Resistor 118 provides positive bias for this diode to compensate the tendency for the diode to develop a negative charge potential at its anode.

With the arrangement described above, the band-pass amplifier is keyed so that the color reference bursts translated thereby are exalted with respect to the chroma sub-carrier components and, in this manner, the detected pulses appearing across cathode resistor 83 in amplifier 24 have a relatively high amplitude regardless of the setting of the chroma contrast control 41. It is to be remembered that these pulses have zero amplitude so long as the demodulating signal from the color oscillator has its proper phase and frequency. However, any tendency for the demodulating signal to vary causes the relatively high amplitude pulses to appear across the cathode resistor with a polarity and amplitude corresponding to the direction and amount of such variation, and these pulses are used to compensate for any such tendency of the oscillator in the manner described herein.

The invention provides, therefore, a new and improved color television receiver which utilizes a minimum of component parts and yet which functions in an improved and efficient manner to demodulate and reproduce a received color television signal.

While a particular embodiment of the invention has been shown and described, modifications may be made and it is intended in the appended claims to cover all such modifications as fall within the true spirit and scope of the invention.

I claim:

1. In a color television receiver for utilizing a color television signal which includes at least one chroma sub-carrier component and which also includes bursts of a reference signal component having a predetermined frequency and phase relation with the sub-carrier component, the combination of a band-pass network for selecting the chroma sub-carrier component and the reference signal bursts of the color television signal, signal developing means for producing a demodulating signal, a chroma demodulator coupled to said band-pass network and to said signal developing means and producing a component in response to the reference signal bursts that varies in accordance with phase variations between the reference signal bursts and said demodulating signal, frequency controlling means for said signal developing means coupled to said demodulator and responsive to said component produced thereby to maintain a selected phase relation between the demodulating signal and the sub-carrier, a source of signal components having a selected timing with respect to said reference signal bursts, means including a coupling circuit for applying said last named signal components to said band-pass network to exalt said reference signal bursts as translated by said band-pass network and applied to said chroma demodulator.

2. In a color television receiver for utilizing a color television signal which includes at least one chroma sub-carrier component and which also includes bursts of a reference signal component having a predetermined frequency and phase relation with the sub-carrier component, the combination of a band-pass amplifier for selecting and amplifying the chroma sub-carrier component and the reference signal bursts of the color television signal, a signal generator for producing a demodulating signal, a chroma demodulator coupled to said band-pass amplifier and to said generator and producing a series of signal components in response to the reference signal bursts that vary in amplitude in accordance with phase variations between the reference signal bursts and said demodulating signal, frequency controlling means for said generator coupled to said demodulator and responsive to said signal components produced thereby to maintain a selected phase relation between said demodulating signal and the sub-carrier component, a source of control pulses occurring in respective time coincidence with said reference signal bursts, and means including a coupling circuit for applying said control pulses to said band-pass amplifier to increase the gain thereof and thereby exalt said bursts as translated by said band-pass amplifier and applied to said chroma demodulator.

3. In a color television receiver for utilizing a color television signal which includes at least one chroma sub-carrier component and which also includes bursts of a reference signal component having the same frequency as the sub-carrier component and in phase quadrature therewith, the combination of a band-pass amplifier for selecting and amplifying the chroma sub-carrier component and the reference signal bursts of the color television signal, said by-pass amplifier having a control element for controlling the gain thereof, an oscillator for producing a demodulating signal of the same frequency as said sub-carrier, a chroma demodulator coupled to said band-pass amplifier and to said oscillator and producing a series of signal components in reponse to the reference signal bursts that vary in amplitude on either side of a reference axis in accordance with the direction of phase variations between the reference signal bursts and said demodulating signal, frequency controlling means for said oscillator coupled to said demodulator and responsive to said signal components produced thereby to maintain an in-phase condition between the demodulating signal and the sub-carrier component, a source of control pulses occurring in respective time coincidence with said reference signal bursts, and coupling means for applying said control pulses to said control element of said band-pass amplifier to increase the gain thereof and thereby exalt said bursts as translated by said band-pass amplifier and applied to said chroma demodulator.

4. In a color television receiver for utilizing a color television signal which includes at least one chroma sub-carrier component, synchronizing components, and bursts of a chroma reference signal having a predetermined frequency and phase relation with the sub-carrier component, and with each of said bursts having a predetermined time relation with respective ones of said synchronizing components, the combination of a band-pass amplifier for selecting the chroma sub-carrier component and the chroma reference signal bursts of the color television signal, an oscillator for producing a demodulating signal, a chroma demodulator coupled to said band-pass amplifier and to said oscillator and producing a series of signal components in response to the reference signal bursts that vary in accordance with phase variations between the reference signal bursts and said demodulating signal, frequency controlling means for said oscillator including an integrating network and responsive to said signal components produced by said demodulator to produce a control signal for said oscillator so as to maintain a selected phase relation between the demodulating signal and the sub-carrier component, circuit means responsive to the synchronizing components of the color television signal for producing a series of pulses having a predetermined timing with respect to respective ones of the synchronizing components, and coupling means coupled to said last-named circuit means and responsive to the series of pulses produced thereby to apply a corresponding series of control pulses to said band-pass amplifier in respective time coincidence with said reference signal bursts to exalt said bursts as translated by said band-pass amplifier and applied to said chroma demodulator.

5. In a color television receiver for utilizing a color television signal which includes at least one chroma sub-carrier component, synchronizing components, and bursts of a chroma reference signal having a predetermined frequency and phase relation with the sub-carrier component, and with each of said bursts having a predetermined time relation with respective ones of said synchronizing components, the combination of a band-pass amplifier for selecting the chroma sub-carrier and the chroma reference signal bursts of the color television signal, an oscillator for producing a demodulating signal, a chroma demodulator coupled to said band-pass amplifier and to said oscillator and producing a series of signal components in response to the reference signal bursts that vary in accordance with phase variations between the reference signal bursts and said demodulating signal, frequency controlling means for said oscillator coupled to said demodulator and including a gating circuit and an integrating circuit, said control network being responsive to said signal components produced by said demodulator for producing a control signal for said oscillator to maintain a selected phase relation between the demodulating signal and the sub-carrier, circuit means including an inductive winding and responsive to the synchronizing components of the color television signal to produce a series of pulses across said winding having a predetermined timing with respect to respective ones of the synchronizing components, said last-named pulses occurring with negative polarity between one side of said winding and an intermediate tap thereon and with positive polarity between the other side of said winding and said intermediate tap, differentiating means connected between said one side of said winding and said intermediate tap for producing differentiated pulses having positive portions occurring in time coincidence with said signal components produced by said demodulator and for supplying said differentiated pulses to said gating circuit to cause said gating circuit to select said signal components and translate the same to said integrating circuit, means including a resistive element connected to said other side of said winding effectively to broaden said positive portions of said differentiated pulses applied to said gating circuit, and a coupling circuit coupled to said one side of said winding and including differentiating means for supplying a series of control pulses to said band-pass amplifier in time coincidence with said reference signal bursts to exalt said bursts as translated by said band-pass amplifier and applied to said demodulator.

6. In a color television receiver for utilizing a color television signal which includes at least one chroma sub-carrier component, synchronizing components, and bursts of a chroma reference signal having a predetermined frequency and phase relation with the sub-carrier component, and with each of said bursts having a predetermined time relation with respective ones of said synchronizing components, the combination of a band-pass amplifier for selecting the chroma sub-carrier and the chroma reference signal bursts of the color television signal, an oscillator for producing a demodulating signal, a chroma demodulator coupled to said band-pass amplifier and to said oscillator and producing a series of signal components in response to the reference signal bursts that vary in accordance with phase variations between the reference signal bursts and said demodulating signal, frequency controlling means for said oscillator coupled to said demodulator and responsive to said signal components produced by said demodulator to maintain a selected phase relation between the demodulating signal and the sub-carrier, circuit means responsive to the synchronizing components of the color television signal for producing a series of negative pulses and a series of positive pulses each having a predetermined time relation with respect to the synchronizing components, differentiating means coupled to said circuit means and responsive to said series of negative pulses for producing a series of differentiated pulses each having a positive portion, means for adding said series of positive pulses to said series of differentiated pulses to produce a series of resultant pulses, and means for supplying said series of resultant pulses to said band-pass amplifier to exalt said reference signal bursts as translated by said band-pass amplifier and applied to said demodulator.

7. In a color television receiver for utilizing a color television signal which includes at least one chroma sub-carrier component, synchronizing components, and bursts of a chroma reference signal having a predetermined frequency and phase relation with the sub-carrier component, and with each of said bursts having a predetermined time relation with respective ones of said synchronizing components, the combination of a band-pass amplifier for selecting the chroma sub-carrier and the chroma reference signal bursts of the color television signal, said amplifier including an electron discharge device, signal translating means, responsive to the synchronizing components of the color television signal for producing a series of pulses having a selected polarity and a predetermined time relation with respect to said synchronizing components, a differentiating circuit coupled to said signal translating means for differentiating said series of pulses to produce a series of differentiated pulses, means for deriving a series of pulses from said circuit means of opposite polarity to said first-mentioned series and for adding said opposite-polarity pulses to said differentiated pulses, and means for impressing the differentiated pulses and the added opposite polarity pulses to said discharge device to increase the conductivity thereof for the duration of each of said bursts of the chroma reference signal.

8. In a color television receiver for utilizing a color television signal which includes at least one chroma sub-carrier component, synchronizing components, and bursts of a chroma reference signal having a predetermined frequency and phase relation with the sub-carrier component, and with each of said bursts having a predetermined time relation with respective ones of said synchronizing components, the combination of a band-pass amplifier for selecting the chroma sub-carrier and the chroma reference signal bursts of the color television signal, said amplifier including an electron discharge device having a control electrode to which the sub-carrier and reference signal bursts are applied, a signal translating stage for translating the synchronizing components of the color television signal and including an output transformer, means for deriving a series of pulses from said transformer having negative polarity and having predetermined time relation with respect to said synchronizing components, means for differentiating said series of pulses to produce a series of differentiated pulses, means for deriving a series of positive pulses from said transformer in time coincidence with said first-mentioned series and for adding said positive pulses to said differentiated pulses, and means for impressing the differentiated pulses and the added positive pulses to said control electrode to increase the conductivity of said discharge device for the duration of each of said bursts of the chroma reference signal.

9. In a color television receiver for utilizing a color television signal which includes at least one chroma sub-carrier component, synchronizing components, and bursts of a chroma reference signal having a predetermined frequency and phase relation with the sub-carrier component, and with each of said bursts having a predetermined time relation with respective ones of said synchronizing components, the combination of a band-pass amplifier for selecting the chroma sub-carrier and the chroma reference signal bursts of the color television signal, said amplifier including an electron discharge device having a control electrode to which the sub-carrier and reference signal bursts are applied and further having a cathode, impedance means connecting said cathode to a point of reference potential, a signal translating stage for translating the synchronizing components of the color television signal and including an output transformer having at least two windings, means for deriving a series of pulses from one of said windings of said transformer having negative polarity with respect to said point of reference potential and having a predetermined time relation with respect to said synchronizing components, means for differentiating said series of pulses to produce a series of differentiated pulses, a damper device connected across at least a portion of the other of said windings, capacitive means connected from one side of said damper device to said point of reference potential, means for deriving from said capacitive means a series of pulses having positive polarity with respect to said point of reference potential and in time coincidence with said first-mentioned series, means for adding such positive-polarity pulses to said differentiated pulses, and means for impressing the differentiated pulses and the added positive-polarity pulses to said control electrode to increase the conductivity of said discharge device for the duration of each of said bursts of the chroma reference signal.

10. In a color television receiver for utilizing a color television signal which includes at least one chroma sub-carrier component, synchronizing components, and bursts of a chroma reference signal having a predetermined time relation with respect to said synchronizing components, the combination of a band-pass amplifier for selecting the chroma sub-carrier and the chroma reference signal bursts of the color television signal, said amplifier including an electron discharge device having a control electrode to which the sub-carrier and reference signal bursts are applied and further having a cathode, impedance means connecting said cathode to a point of reference potential, a signal translating stage for translating the synchronizing components of the color television signal and including an output transformer having at least two windings, means for deriving a series of pulses from one of said windings of said transformer having negative polarity with respect to said point of reference potential and having a predetermined time relation with respect to said synchronizing pulses, means for differentiating said series of pulses to produce a corresponding series of differentiated pulses, a damper diode connected across at least a portion of the other of said windings, capacitive means connected from one side of said damper diode to said point of reference potential, means for deriving from said capacitive means a series of pulses having positive polarity with respect to said point of reference potential and in time coincidence with said first-mentioned series, a coupling network for adding said positive-polarity pulses to said differentiated pulses and for applying the resultant pulses to said control electrode, and a unilaterally conductive device connected from said coupling network to a point on said impedance means connecting said cathode to said point of reference potential so as to prevent said control electrode from assuming a positive potential with respect to said cathode in the presence of said resultant pulses.

11. In a color television receiver for utilizing a color television signal which includes a pair of like-frequency chroma subcarrier components each amplitude modulated with different color information and having a predetermined phase relation, and which also includes bursts of a reference signal component having the frequency of the subcarrier components and having a predetermined phase relation with the subcarrier components, the combination of a detector for demodulating the color television signal, a band-pass filter for selecting the chroma subcarrier components and the bursts of the reference signal component from the demodulated color television signal, a signal-generating circuit for producing a first demodulating signal having the frequency and phase of one of the chroma subcarrier components and for producing a second demodulating signal having the frequency and phase of the other chroma subcarrier component, frequency-controlling means responsive to said bursts of said reference signal component for controlling said signal-generating circuit to maintain the aforesaid phase and frequency relation between said demodulating signals and said chroma subcarrier components, a source of signal components having a selected timing with respect to said bursts of said reference components, and means including a coupling circuit coupled to said source and to said band-pass filter and responsive to said last named signal components for exalting said bursts of said reference signal component translated by said band-pass filter as compared with the subcarrier components selected thereby.

12. In a color television receiver for utilizing a color television signal which includes synchronizing components, a pair of like frequency chroma subcarrier components each amplitude modulated with different color information and having a predetermined phase relation, and which further includes bursts of a reference signal component having the frequency of the subcarrier components and having a predetermined phase relation with the subcarrier components, said bursts recurring with a selected timing with respect to the synchronizing components, the combination of a detector for demodulating the color television signal, a band-pass amplifier for selecting the chroma subcarrier components and the bursts of the reference signal component from the demodulated color television signal, a signal generator for producing a first demodulating signal having the frequency and phase of one of the chroma subcarrier components and for producing a second demodulating signal having the frequency and phase of the other chroma subcarrier component, frequency-controlling means responsive to said bursts of said reference signal component for controlling said signal generator to maintain the aforesaid phase and frequency relation between said demodulating signals and said chroma subcarrier components, signal developing means synchronized by the synchronizing components for producing a series of pulses recurring in time coincidence with the bursts of said reference signal component, and means for impressing said pulses on said band-pass amplifier to increase the gain of said amplifier for at least a portion of each of said bursts so as to exalt said bursts as translated by said band-pass amplifier with respect to the subcarrier components.

13. In a color television receiver for utilizing a color television signal which includes synchronizing components, a chroma subcarrier modulated with color information, and which further includes bursts of reference signal having the frequency of the subcarrier and a predetermined phase relation with the color information modulated thereon, said bursts recurring with a selected timing with respect to the synchronizing components, the combination of a detector for demodulating the color television signal, a band-pass amplifier coupled to said detector for selecting and translating the chroma subcarrier and the bursts of reference signal, signal developing means for producing a reference signal for demodulating said chroma subcarrier, said reference signal from said signal developing means having the frequency of the chroma subcarrier and a predetermined phase relation with the color information modulated thereon, means responsive to said bursts of reference signal for controlling said signal developing means to maintain said predetermined phase and frequency relation between said reference signal from said signal developing means and said chroma subcarrier and the color information modulated thereon, pulse-producing means synchronized by the synchronizing components of the color television signal for producing a series of pulses recurring in time coincidence with said bursts of reference signal, and means including a coupling circuit for impressing said pulses on said band-pass amplifier to increase the gain of said amplifier for at least a portion of the duration of individual ones of said bursts so as to exalt said bursts as translated by said band-pass amplifier with respect to the chroma subcarrier translated thereby.

References Cited in the file of this patent

UNITED STATES PATENTS

| | | |
|---|---|---|
| 2,586,957 | Keizer | Feb. 26, 1952 |
| 2,678,348 | Ballard | May 11, 1954 |
| 2,754,356 | Espenlaub | July 10, 1956 |